(12) United States Patent
Ling et al.

(10) Patent No.: US 8,184,527 B2
(45) Date of Patent: May 22, 2012

(54) METHOD FOR CONDUCTING REDUNDANCY CHECKS IN A CHAIN NETWORK

(75) Inventors: Ming-Huang Ling, Shing Tien (TW); Ming-Chuang Chen, Taipei (TW)

(73) Assignee: Moxa Inc., Shing Tien (TW)

( * ) Notice: Subject to any disclaimer, the term of this patent is extended or adjusted under 35 U.S.C. 154(b) by 366 days.

(21) Appl. No.: 12/585,418

(22) Filed: Sep. 15, 2009

(65) Prior Publication Data

US 2010/0296391 A1    Nov. 25, 2010

(30) Foreign Application Priority Data

May 21, 2009   (TW) ............................... 98116952 A

(51) Int. Cl.
*H04J 1/16* (2006.01)
(52) U.S. Cl. .......................... 370/216; 370/242; 370/362
(58) Field of Classification Search .......... 370/216–223, 370/225, 227, 242, 362
See application file for complete search history.

(56) References Cited

U.S. PATENT DOCUMENTS

| 7,656,790 B2 * | 2/2010 | Wakumoto et al. ........... 370/221 |
| 2004/0223503 A1 * | 11/2004 | Lynch et al. ................... 370/404 |
| 2008/0239943 A1 * | 10/2008 | Hauenstein et al. .......... 370/216 |

\* cited by examiner

*Primary Examiner* — Brenda H Pham
(74) *Attorney, Agent, or Firm* — Bacon & Thomas, PLLC

(57) ABSTRACT

The present invention relates to a method for conducting redundancy checks in a chain network, wherein the two ends of the chain network are equipped with a first switch and a second switch respectively, and a port of the first or second switch used for communicating with an external network is set to be blocked, so that when an link failure happens to any switch of the chain network, the two switches close to the link failure port sends control packets to the first and second switches respectively to forward the port that is originally blocking, thus making the network to return to normal state quickly. Besides, as the first and second switches are used to connect other chain networks, external network devices or external redundant network architectures, it allows more network nodes to be included in single network architecture and provides flexibility and compatibility in use by including different redundancy mechanisms.

26 Claims, 8 Drawing Sheets

METHOD FOR CONDUCTING REDUNDANCY CHECKS IN A CHAIN NETWORK

This application claims the priority benefit of Taiwan patent application number 098116952, filed on May 21, 2009.

BACKGROUND OF THE INVENTION

1. Field of the Invention

The present invention relates to a method for conducting redundancy checks in a chain network, more particularly, to establishment of a redundancy mechanism in the chain network, in which the communication ports of a first switch and a second switch are set to be forwarding and blocking respectively, so that when an link break happens to the chain network, the two switches close to the break point will send control packets to the first and second switches respectively to forwarding the port that is originally blocking, thus allowing the network to return to normal state quickly.

2. Description of the Prior Art

With quick changes in IT and vigorous developments on Internet technologies, network technologies are utilized to help people to communicate with each other beyond boundaries. Progress in such regard not only brings more conveniences to the public, but also provides enterprises with a more cost-effective way of production.

However, due to instability of network devices, production may be interrupted, causing heavy losses to enterprises. Therefore, a focus of network architecture in an enterprise is how to develop the ability of restoring a network reliably and quickly in case of disconnection.

A solution to network outages as stated above is to supplement backup network devices in the network architecture to establish a redundant environment. However, the presence of these backup devices will easily cause looping of the network, which will further lead to such problems as broadcast storm, simultaneous receipt of the same packets by a single network device and instability of the MAC address of the network device. Under such circumstance, switches will learn and change the address uninterruptedly, and the burden on microprocessors of the network devices will increase. Currently, IEEE802.1D—Spanning Tree Protocol (STP)—is adopted to eliminate these problems. Yet in an STP environment, when it is necessary to start backup devices in response to any network device failure, it will take longer recalculation time to recover the network to its normal state. In order to shorten the time to live, IEEE adopts the new 802.1W—Rapid Spanning Tree Protocol (RSTP)—to reduce the recalculation time by shortening the time for conversion of the connection port state and setting up an alternate port.

However, both STP and RSTP is a tree network topology. If the tree topology is too big with too many network devices (i.e. network nodes), it will cause the backup devices to respond at a lower speed. So the tree topology will limit the number of nodes in a single network. For practical applications of industrial control devices, once the network crash long time, it will cause heavy losses or serious incidents. Recently, the industry environment often uses a ring network; however, when a redundancy technology be set up in the ring network, the increasing node of the ring network occurs higher recovery time and lower reliability, Therefore, multi ring network topology is adopted to meet the requirements for quicker recovery capability and more network nodes in a single network. Refer to FIG. 8, which shows redundant system in ring networks. In this figure, ring network A consists of a plurality of switches A1~A5, while ring network B includes a plurality of switches B1~B5. For example, if the redundancy technology such as a ring coupling system is set up among a plurality of ring networks, the port of the switch A5 that connects the port of the switch B1 will be forwarded, while the port of the switches A4 that connects the port of switches B2 will be blocked. Ring coupling is utilized to forwarding state the port of the switches A4 that connects the port of switches B2 automatically when the switches A5 and B1 cannot communicate. Though the above-mentioned network recovery capability is more effective than STP and RSTP, however, the ring coupling system is more complex to set up between the ring networks and reduce network reliability.

Compared to the strict requirement for network stability in industrial control, the reliability of such network operation is rather low. And if this redundancy mechanism is adopted by enterprises in ring networks for production and manufacture, it will increase the risks that network devices are incompatible with each other and cannot transmit data among them or the machine cannot work continuously. All these will have great impact on enterprises' profits and long-term benefits.

Therefore, how to eliminate the conventional problems and disadvantages is what the firms involved in this industry needs urgently to research and improve.

SUMMARY OF THE INVENTION

In view of the aforesaid problems and disadvantages, the inventor has collected related information, conducted assessments and taken considerations in many aspects, and based on his own experience of many years in this industry, has finally invented this method for conducting redundancy checks in a chain network.

The primary object of the present invention is to control communication of switches with an external network at both ends, so that the communication port of the first switch is forwarding, while the second switch sets its communication port to be blocking, when the chain network is in a normal operational state. In this context, the chain network will communicate with a external network via the communication port of the first switch. When the chain network is break, the two switches close to the break point will send control packets to the first and second switches respectively, so as to forwarding the communication port that is originally blocking and recover the communication to the external network. As the first switch or second switch is directly set to be forwarding, it is not necessary to recalculate the best path for network execution in the process of recovering the chain network from its outage, thus recover the network quickly in the chain network architecture. On one hand, this will enhance the reliability of the chain network, and on the other hand, this will facilitate network management.

Another primary object of the present invention lies in the way to set the communication ports state for the first or second switches of the chain network themselves, the original settings for the existed networks architecture that the chain network attach to do not have to be changed.

At this moment, it is not necessary to establish a complex coordinating mechanism between the chain networks and the other external ones, either. Instead, the newly-added chain networks can operate directly by connecting their first and second switches with the original network architecture for network expansion. This method will achieve the effects of including many network nodes in a single network architecture, increased extendibility and inconvenience.

The secondary object of the present invention lies in use of the first or second switch of a chain network for communication with external networks, which may be external redundant networks. And when the chain network and the external redundant networks transmit packets to each other, the first or second switch can be utilized to block redundancy control packets from the external networks. By doing so, many different redundancy mechanisms may be included in a single network architecture and do not interfere with each other, thus increasing compatibility of these networks.

A further object of the present invention is to ensure that when a single or plurality of chain networks are connected with external network devices or external redundancy network structures, it is not necessary to connect the first switch of each chain network with its second switch. If a network break occurs, the two switches close the break point will send packets to the first and second switches at the same time, thus saving communication ports and network cables and reducing high costs in equipment construction for enterprises.

DETAIL DESCRIPTION OF THE INVENTION

To achieve the objects and effects stated above as well as the technology and framework adopted in the present invention, some examples of the preferred embodiments of the present invention are given with reference to the accompanying drawings to describe the features and functions of the present invention in detail.

Figure 1:
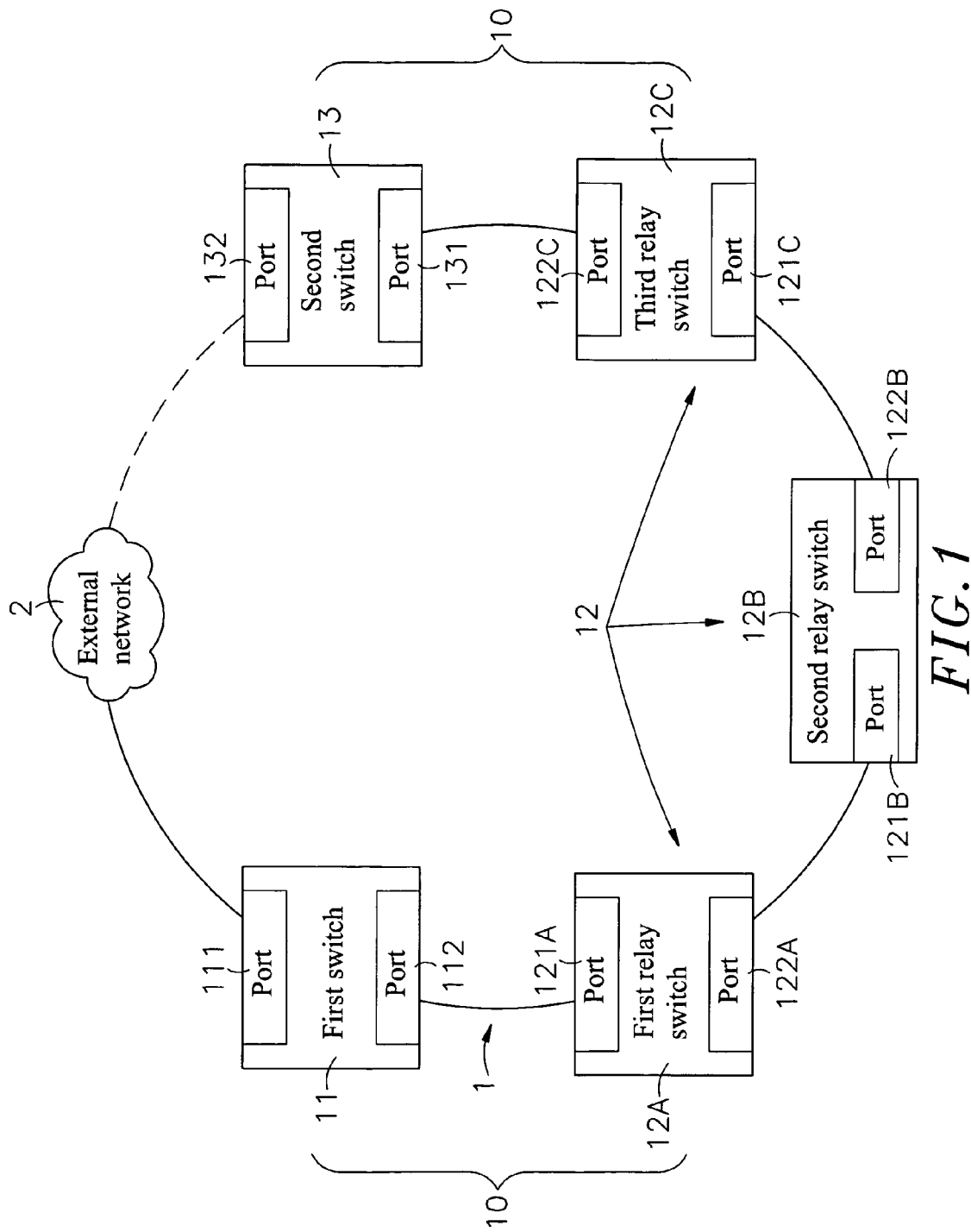
FIG. 1 schematically shows the normal state of a chain network in the redundant architecture according to one embodiment of the present invention.

Refer to FIG. 1, which shows the architecture of a chain network 1 of the present invention, including a plurality of switches 10, and each of these switches includes a first switch 11, a relay switch 12 and a second switch 13, wherein:

The first switch 11 and the second switch 13 are located at two opposite ends of the chain network 1, and the relay switch 12 lies between the first switch 11 and the second switch 13, wherein the first switch 11, second switch 13 and relay switch 12 may include two or more ports. For the present invention, two ports are considered in examples of the embodiments and there may be one or more relay switches 12. However, the number of the ports and relay switches shall not be construed as a limitation on the appended claims of the present invention.

Three relay switches 12 are described in the example of embodiments of the present invention, including a first relay switch 12A, a second relay switch 12B and a third relay switch 12C. Moreover, the first switch 11 and second switch 13 of the chain network 1 includes first ports 111 and 131 and second ports 112 and 132, and each of the first relay switch 12A, second relay switch 12B and third relay switch 12C contains first ports 121A, 121B and 121C and second ports 122A, 122B and 122C.

The first switch 11, relay switch 12 and second switch 13 is connected by wired or wireless methods, wherein the wired method may be based on twisted pair cables or fiber optic cables, etc., and the wireless method is based on IEEE 802.11 or 802.16 standards, etc.

Figure 2:
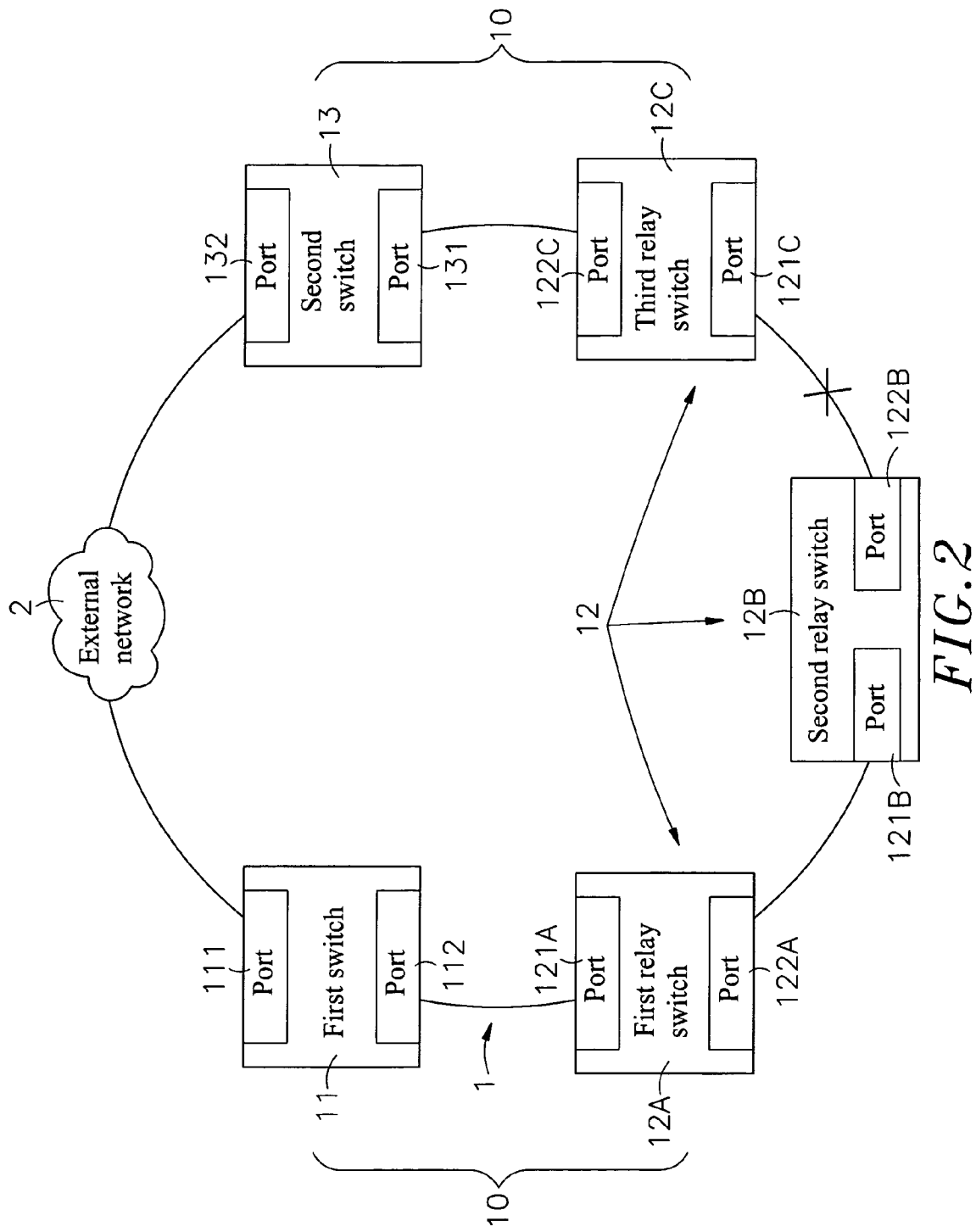
FIG. 2 schematically shows the abnormal state of a chain network in the redundant architecture according to one embodiment of the present invention.
Figure 3:
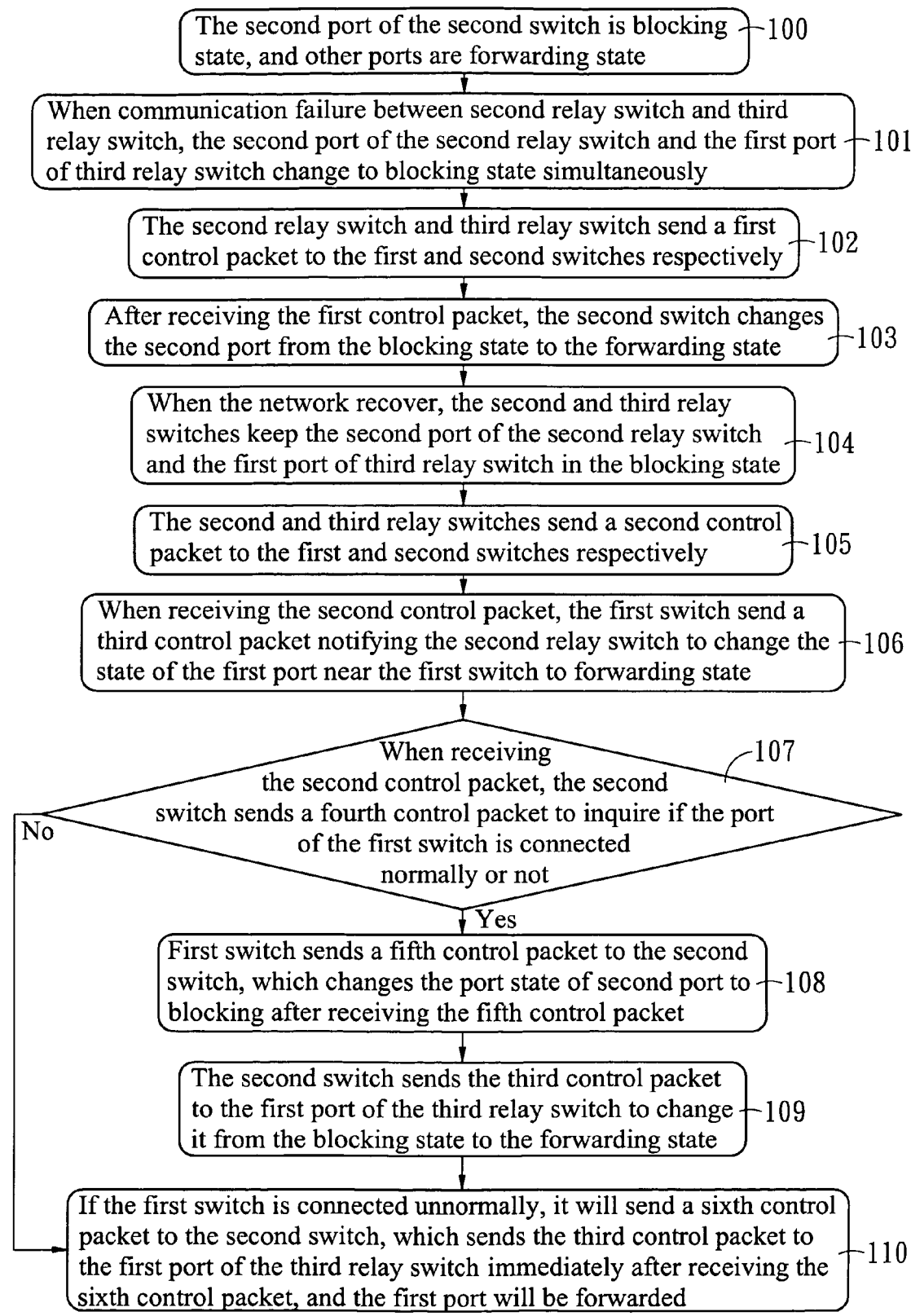
FIG. 3 is a flow chart indicating the method for conducting redundancy checks in a chain network of the present invention.
Figure 4:
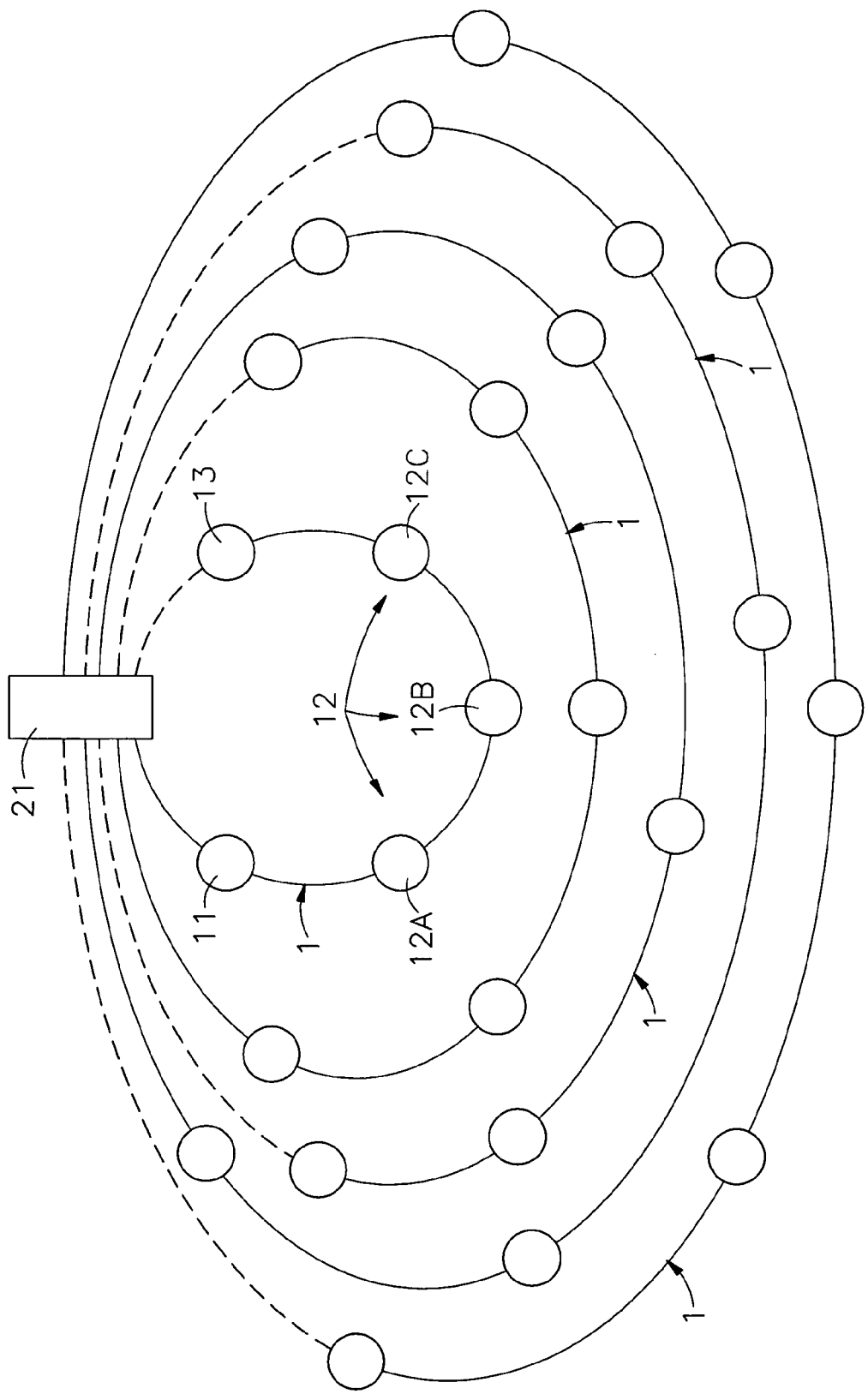
FIG. 4 schematically shows connection of a chain network included in the present invention with external network devices.

Refer to FIGS. 1~3. As shown clearly in these figures, under the circumstance of stable network operation, each chain network 1 definitely includes a port of a switch connected with an external network 2 that is kept in the blocking state. In this example of the embodiment, the second port 132 of the second switch 13 will be selected to be blocked, while the remaining ports of the first switch 11 and relay switch 12 will be set to be forwarded. If any switch of the chain network 1 fails or a link break occurs to any port that is forwarding, the second port 132 of the second switch 13 will be changed to forwarding. In this example of the embodiment, the detail descriptions are given on the assumption that the second port 122B of the second relay switch 12B is link failure, wherein the process for handling the redundant chain network architecture is as follows:

(100) Preset the second port 132 of the second switch 13 of the chain network 1 to be blocking state, and preset the ports of the first switch 11 and relay switch 12 to be forwarding state.

(101) When communication failure between second relay switch 12B and third relay switch 12C of the chain network, the second port 122B of the switch 12B and the first 121C of switch 12C changes to blocking state simultaneously.

(102) The second relay switch 12B and third relay switch 12C will send a first control packet (CF1) to the first switch 11 and second switch 13 respectively through the first port 121B and second port 122C.

(103) After receiving the first control packet, the second switch 13 changes the second port 132 from the blocking state to the forwarding state.

(104) When the network recovery, the second relay switch 12B and third relay switch 12C will keep the second port 122B and first port 121C in the blocking state to avoid forming infinite looping in the network.

(105) The second relay switch 12B and third relay switch 12C will send a second control packet (CF2) to the first switch 11 and second switch 13 via the first port 121B and second port 122C respectively to notify restoration of connectivity.

(106) When receiving the second control packet, the first switch 11 will send a third control packet (CF3) notifying the second relay switch 12B to change the state of the first port 121B near the first switch 11 to forwarding state.

(107) When receiving the second control packet, the second switch 13 will send a fourth control packet (CF4) to inquire if the port of the first switch 11 is connected normally or not. If yes, proceed to step (108); otherwise, proceed to step (110).

(108) If the first switch 11 is connected normally, it will send a fifth control packet (CF5) to the second switch 13, which changes the port state of second port 132 to blocking after receiving the fifth control packet.

(109) The second switch 13 sends the third control packet to the first port 121C of the third relay switch 12C to change it from the blocking state to the forwarding state.

(110) If the first switch 11 is connected unnormally, it will send a sixth control packet (CF6) to the second switch, which sends the third control packet to the first port 121C of the third relay switch 12C immediately after receiving the sixth control packet, and the first port 121C will be forwarded.

In this way, redundant chain network architecture can be used to quickly recovery an enterprise's network to its normal communication state. When the chain network 1 is connected with the external network 2, the external network 2 may include one or more external network devices 21 or redundant network architecture 22, as shown in FIGS. 1~4. According to these figures, if the chain network 1 is connected with the external network device 21, it will operate only by connecting the first switch 11 and second switch 13 with the external network device 21. Connection of each chain network 1 with the external network device 21 is achieved by directly linking the first port 111 of the first switch 11 and second port 132 of the second switch 13 with the external network device 21, wherein the first port 111 or second port 132 remains in the blocking state. This will allow the plurality of chain networks 1 to be connected with the external network device 21 without interference with each other. Besides, the external network device 21 may also be connected to a plurality of chain networks 1 with a redundancy mechanism.

On the other hand, the switches decide whether communication of ports is linked failure or recovered through the physical layer (PHY) or sending detecting packets. However, the way to detect the communication state of the ports by the switches shall not be construed as limiting the appended claims of the present invention.

Figure 5:
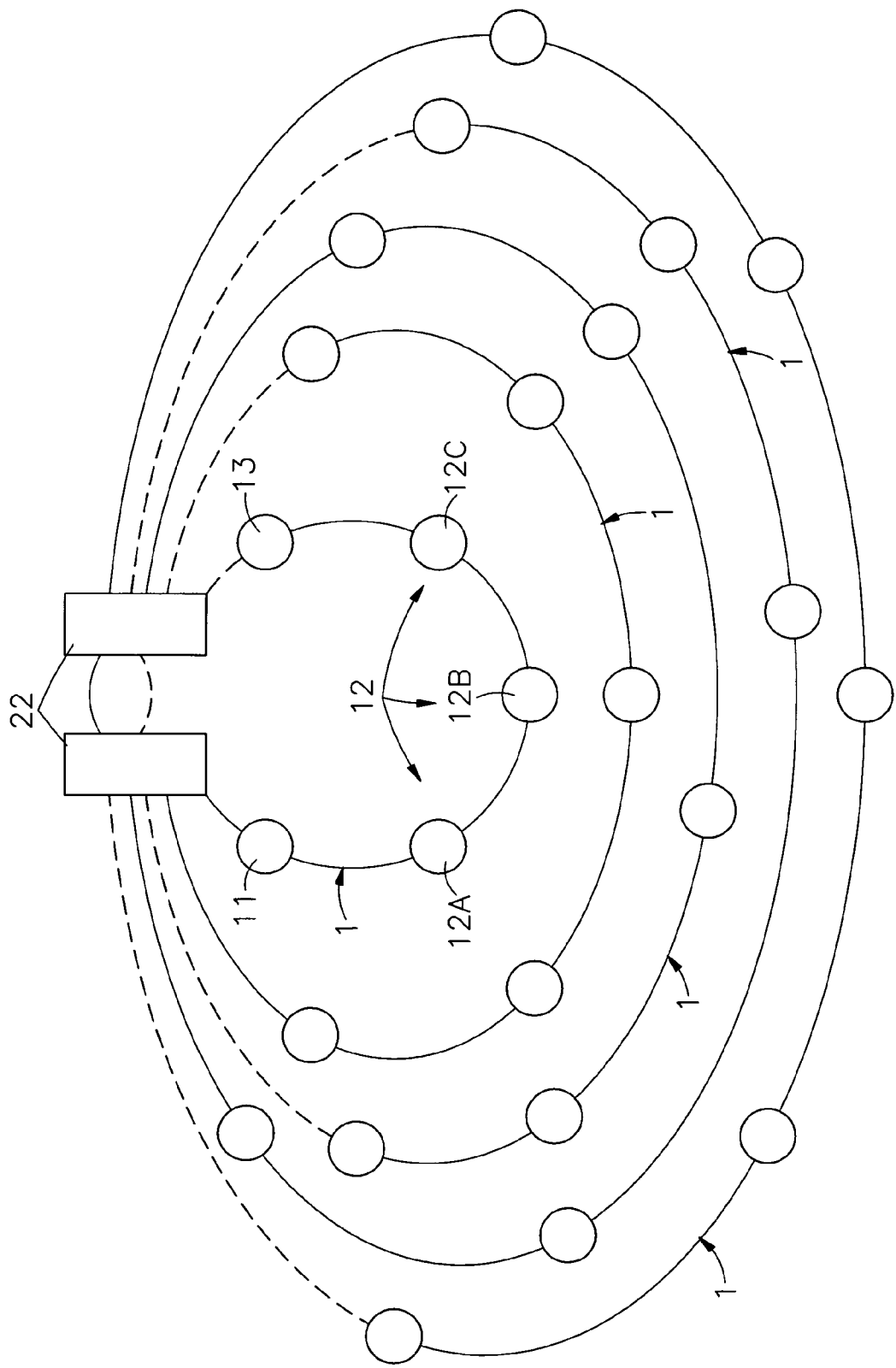
FIG. 5 schematically shows connection of a chain network included in the present invention with external redundant network architecture.

Further refer to FIG. 5, which clearly shows that the chain network 1 can also be connected with the external redundant network architecture 22, such as a redundant ring network, STP or RSTP network architecture. The external redundant network architecture 22 can regularly detect if network connectivity is normal or not by sending control packets. If there is abnormality, the redundancy mechanism will be started to forward the backup circuit. When receiving a redundancy control packet from the external redundant network architecture 22, the first switch 11 or second switch 13 of the chain network 1 do not transmit this packet to the next switch of the chain network 1, thus avoiding participation in operation of the external redundant network architecture 22. Such approach will not only prevent interference with each other when the chain network 1 is connected with the external redundant network architecture 22, but also offer many kinds of redundancy mechanisms for a large-scale network architecture. On the other hand, since ring coupling with the ring network architecture is not required in the architecture of the chain network 1 in this present invention, it will help reduce complexities in connecting with the ring network architecture. In addition, because it is not necessary to set up a connecting line between the first switch 11 and the second switch 13 for linking the chain network 1 with the external redundant network architecture 22, at least a line and two ports can be saved as a result. For expensive network devices, saving ports of switches will significantly reduce corporate investments into equipment construction.

Figure 6:
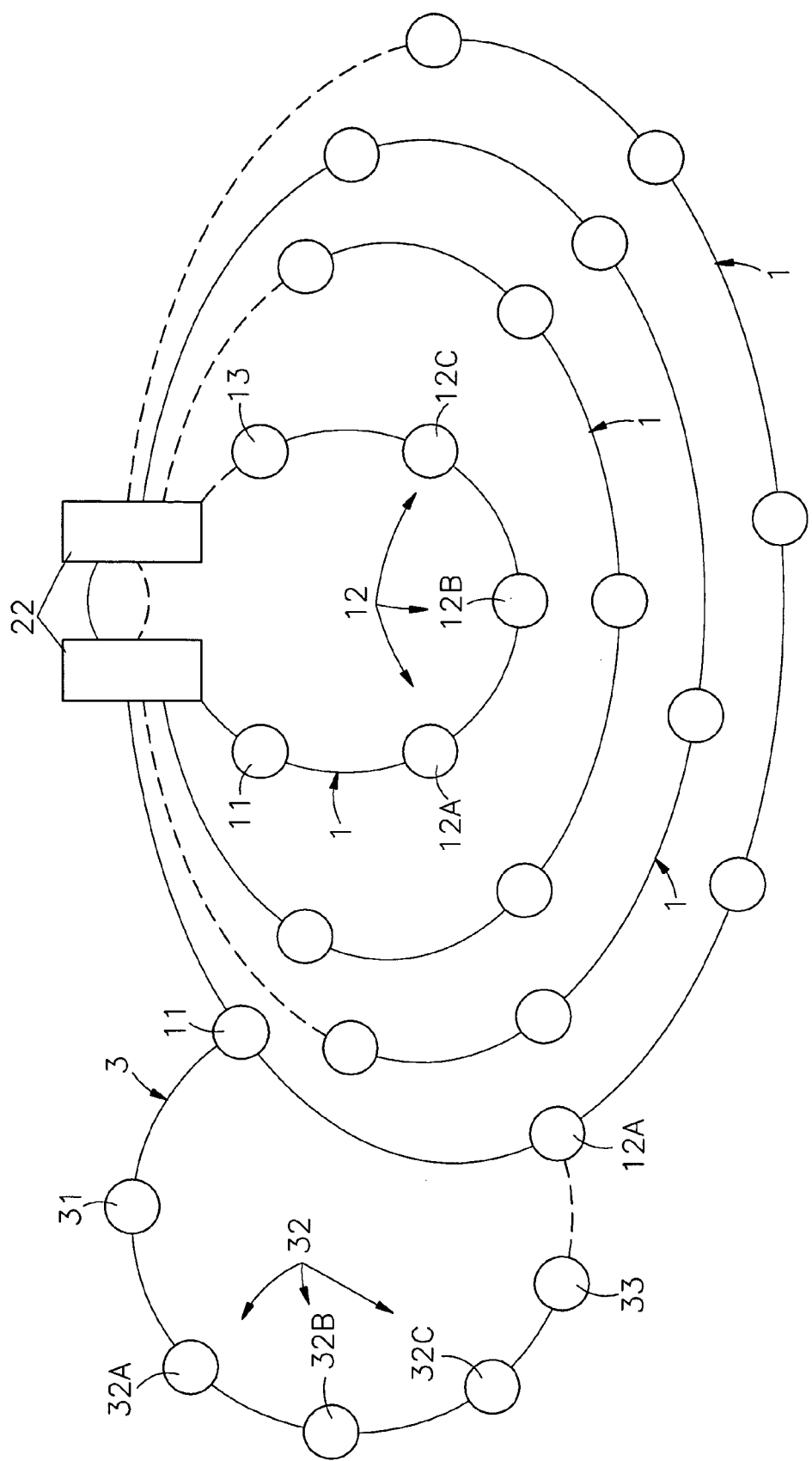
FIG. 6 schematically shows connection of a chain network included in the present invention with a second chain network.

In addition, as shown in FIG. 6, the chain network 1 itself can also connect with a second chain network 3, wherein the second chain network 3 also includes a first switch 31 and a second switch 33 respectively at both ends, and there are a first relay switch 32A, a second relay switch 32B and a third relay switch 32C connected between the first switch 31 and second switch 33. The first switch 31 can be connected with the first switch 11 of the chain network 1, while the second switch 33 can be linked with the first relay switch 12A of the chain network 1 and blocking the port connecting the second switch 33 with the first relay switch 12A to avoid occurrence of looping. However, the second chain network 3 can also be connected with any switch of the chain network 1 through the first switch 31 and second switch 33, and this example of embodiment is given only for illustration.

Figure 7:
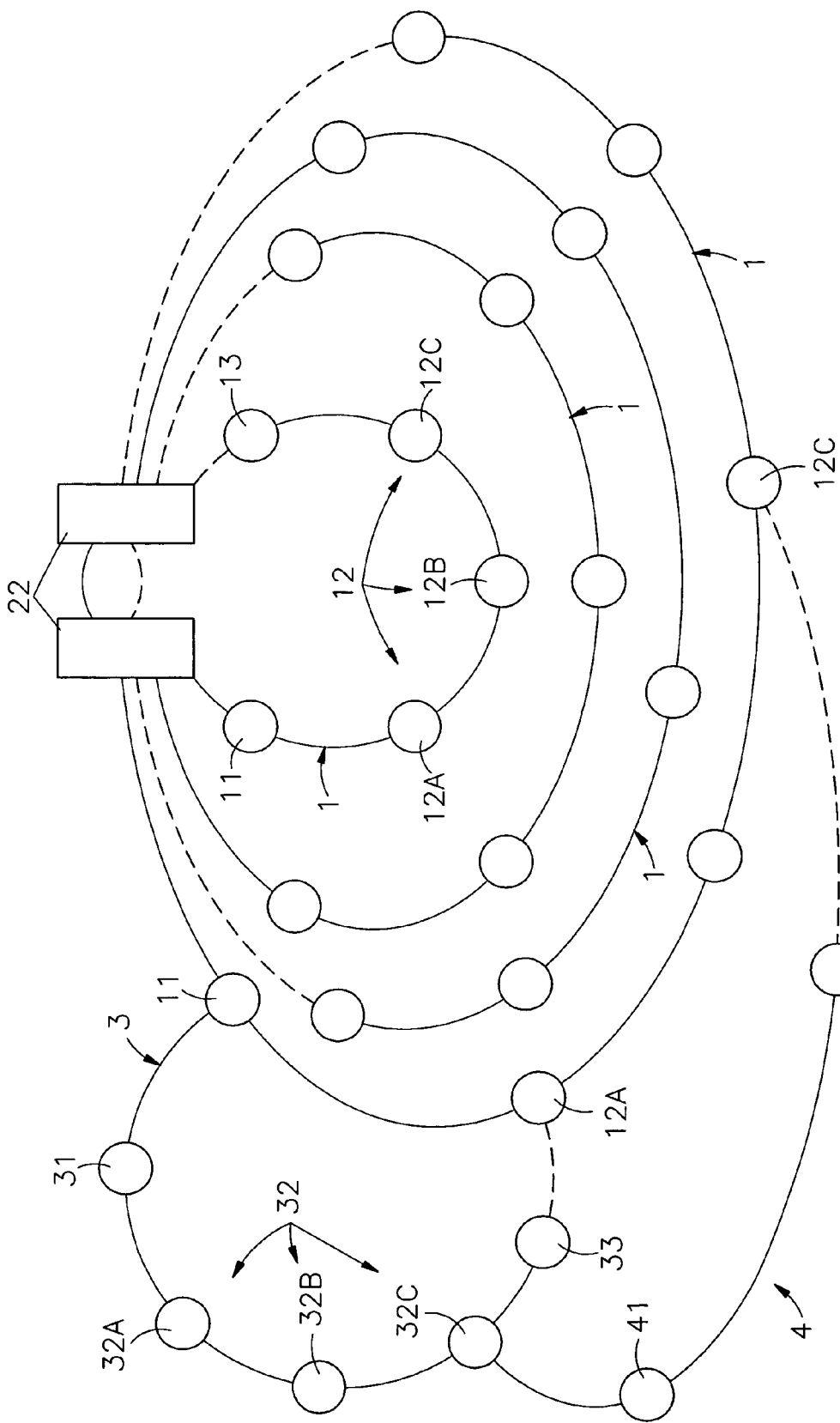
FIG. 7 schematically shows connection of a chain network included in the present invention and a second chain network with a third chain network.
Figure 8:
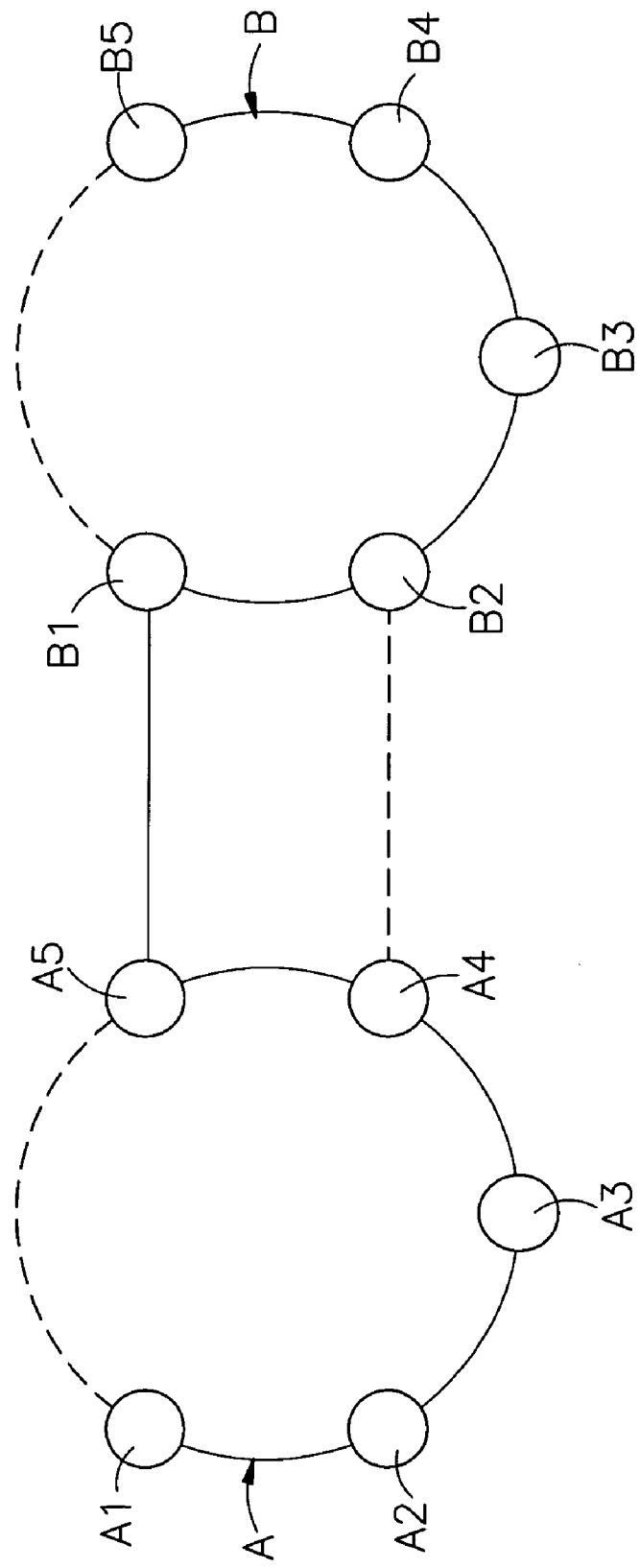
FIG. 8 is a schematic drawing of the redundant architecture for ring networks in conventional use.

Refer to FIG. 7, which shows that the redundancy mechanism of chain networks may be executed in the architecture that only includes first and second switches, and that a single chain network 1 can be linked with a plurality of the chain network 1. And the network architecture can also be supplemented with a third chain network 4, which includes a first switch 41 and a second switch 42, wherein the first switch 41 can be linked with the third relay switch 32C of the second chain network 3, and the second switch 42 can be connected with the third relay switch 12C of the chain network 1 and keep switching off the port that links the second switch 42 with the third relay switch 12C to prevent occurrence of looping.

In the above descriptions, it is not necessary to establish complex network protocols, change other settings for network architecture or stipulate special codes (unique ID) when the first switches 11, 31 and 41, second switches 13, 33 and 42 or ports are connected with the external network device 21, external redundant network architecture 22 or other chain network architectures, thus increasing flexibility in expansion of the chain network 1 effectively.

To sum up, when applied, the method for handling redundancy architectures in a chain network as disclosed in the present invention has the advantages as follows:

(1) The present invention adopts the architecture of a chain network to establish a redundancy mechanism to blocking state of the second port 132 of the second switch 13 and forwarding state of other ports of the chain network 1. If any of the switches of the chain network 1 fails, the port of the second switch 13 that is blocking will be changed to forwarding. Since this approach directly focuses on the ports of the first switch 11 or second switch 13 for blocking or forwarding, it is not necessary to recalculate the best path for network execution in the process of recovery from network outages, so it can effectively achieve the result of restoring a network to its normal state quickly and saving the time cost for enterprises.

(2) In the present invention, the chain network 1 can be connected with the external redundant network architecture 22, thus allowing single network architecture to include different redundant network architectures without conflict between them. Besides, when the chain network 1 is connected with the external network device 21 or external redundant network architecture 22, it does not require connection of the first switch 11 of the chain network 1 with its second switch 13, thus saving ports and network cables and reducing the costs in network devices for enterprises.

(3) In the present invention, the port of the first switch 11 or second switch 13 of the chain network 1 is set to be blocked, and this allows users to effectively manage outage or connectivity of the whole network (4) The present invention also allows a plurality of chain networks 1 to be connected with the external network device 21 or external redundant network architecture 22. Since such connection is achieved by using the first port 111 of the first switch 11 and the second port 132 of the second switch 13, it prevents interference among the plurality of chain networks 1 when they operate.

(5) In the present invention, the chain network 1 can also be extended to include the second chain network 3 and third chain network 4 without the need to make changes in the original chain network 1, and the extended chain network can be connected with a single or plurality of chain networks, providing high flexibility in network extendibility.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What the invention claimed is:

1. A method for conducting redundancy checks in a chain network, wherein the network architecture includes a chain network with a plurality of switches; the chain network have at least two switches at both ends, namely a first switch and a second switch; one or more relay switches are connected between the first switch and second switch, both of which are connected with an external network respectively; the method for handling redundancy mechanisms comprising the steps of:
   (A) the port of the second switch connecting with the external network is set to blocking state, while ports of other switches of the chain network are set to be forwarding state;
   (B) If any communication failure happen in the chain network, the port of the switch that is linked with the both side of failure will be blocked;
   (C) the two switches whose blocking the link fail point send a first control packet to the first switch and second switch respectively;
   (D) the port of the second switch that is originally set to blocking state changes to forwarding state after receiving the first control packet.

2. The method for conducting redundancy checks in a chain network according to claim 1, wherein the blocked port will carry out the following steps when returning to normal operation state:
   (a) maintain the blocking state of the port of the switches;
   (b) the two switches that include the blocking state port sends a second control packet to the first switch and second switch respectively;
   (c) after receiving the second control packet, the first switch sends a third control packet for changing the port state of the switch that close to failure point and near the first switch to forwarding state;
   (d) after receiving the second control packet, the second switch sends a fourth control packet to inquire if connection of the port of the first switch is normal or not; if yes, proceed to step (e); otherwise, proceed to step (g);
   (e) the first switch sends a fifth control packet for blocking the port of the second switch, which connect the external network;
   (f) the second switch sends the third control packet for changing the port state of the switch that close to failure point and near the second switch to forwarding state;
   (g) the first switch sends a sixth control packet to the second switch, the second switch sends third control packet for changing the port state of the switch that close to failure point and near the second switch to forwarding state.

3. The method for conducting redundancy checks in a chain network according to claim 1, wherein the external network can be an external network device, which is connected with the first switch and second switch of the chain network respectively through the ports that are forwarded and blocked.

4. The method for conducting redundancy checks in a chain network according to claim 1, wherein the external network can be an external redundant network architecture, which is connected with the first switch and second switch of the chain network respectively through the ports that are forwarded and blocked.

5. The method for conducting redundancy checks in a chain network according to claim 4, wherein the external redundant network architecture can be a ring network architecture.

6. The method for conducting redundancy checks in a chain network according to claim 4, wherein the external redundant network architecture can be based on STP or RSTP.

7. The method for conducting redundancy checks in a chain network according to claim 1, wherein the switches detect link failure of the port by sending control packets.

8. The method for conducting redundancy checks in a chain network according to claim 1, wherein the switches detect link failure of the port through the physical layer.

9. The method for conducting redundancy checks in a chain network, wherein the network architecture consists of a chain network and second chain network, both of which include a plurality of switches; at both ends, the chain network and the second chain network have at least a first switch and a second switch that are respectively connected with an external network, and one or more relay switches are connected between the first switch and second switch; the first switch and second switch of the second chain network is connected with two switches of the chain network respectively, and the method for handling redundancy mechanisms comprising the steps of:
   (A) the port of the second switches connecting with the external network is set to blocking state, while ports of other switches of the chain network are set to be forwarding state;
   (B) If any communication failure happen in the chain network, the port of the switch that is linked with the both side of failure will be blocked;
   (C) the two switches whose blocking the link fail point send a first control packet to the first switch and second switch respectively;
   (D) the port of the second switch that is originally set to blocking state change to forwarding state after receiving the first control packet.

10. The method for conducting redundancy checks in a chain network according to claim 9, wherein the blocked port will carry out the steps as follows when returning to normal state:
   (a) maintain the blocking state of the port of the switches;
   (b) the two switches that include the blocking state port sends a second control packet to the first switch and second switch respectively;
   (c) after receiving the second control packet, the first switch sends a third control packet for changing the port state of the switch that close to failure point and near the first switch to forwarding state;

(d) after receiving the second control packet, the second switch sends a fourth control packet to inquire if connection of the port of the first switch is normal or not; if yes, proceed to step (e); otherwise, proceed to step (g);

(e) the first switch sends a fifth control packet for blocking the port of the second switch, which connect the external network;

(f) the second switch sends the third control packet for changing the port state of the switch that close to failure point and near the second switch to forwarding state;

(g) the first switch sends a sixth control packet to the second switch, the second switch sends third control packet for changing the port state of the switch that close to failure point and near the second switch to forwarding state.

11. The method for conducting redundancy checks in a chain network according to claim 9, wherein the external network may be an external network device, which is connected with the first and second switches of the chain network respectively through the forwarding state and blocking state ports.

12. The method for conducting redundancy checks in a chain network according to claim 9, wherein the external network may be an external redundant network architecture, which is linked with the first and second switches of the chain network respectively through the forwarding state and blocking state ports.

13. The method for conducting redundancy checks in a chain network according to claim 12, wherein the external redundant network architecture can be an architecture applicable to redundant ring networks.

14. The method for conducting redundancy checks in a chain network according to claim 12, wherein the external redundant network architecture can be a network architecture that is based on STP or RSTP.

15. The method for conducting redundancy checks in a chain network according to claim 9, wherein the chain network and second chain network can be further connected with a third chain network, which has the first switch and second switch at its both ends respectively, and one or more relay switches are installed between the first switch and second switch; and the first and second switches of the third chain network can be connected with the chain network and second chain network respectively through the forwarding state and blocking state ports.

16. The method for conducting redundancy checks in a chain network according to claim 9, wherein the switches detect link failure of the port by transmitting packets.

17. The method for conducting redundancy checks in a chain network according to claim 9, wherein the switches detect link failure of the port through the physical (PHY) layer.

18. A method for conducting redundancy checks in a chain network, wherein the network architecture consists of a chain network and a second chain network, both of which include a plurality of switches respectively; at least a first switch and second switch connected with the external network respectively is installed at both ends of the chain network and second chain network, and the first switch and second switch of the second chain network is connected with two switches of the chain network respectively; and the method for handling redundancy mechanisms comprising the steps of:

(A) the port of the second switches connecting with the external network is set to blocking state, while ports of other switches of the chain network are set to be forwarding state;

(B) If any communication failure happen in the chain network, the port of the switch that is linked with the both side of failure will be blocked;

(C) the two switches whose blocking the link fail point send a first control packet to the first switch and second switch respectively;

(D) the port of the second switch that is originally set to blocking state change to forwarding state after receiving the first control packet.

19. The method for conducting redundancy checks in a chain network according to claim 18, wherein the blocked port will carry out the steps as follows when returning to normal state:

(a) maintain the blocking state of the port of the switches;

(b) the two switches that include the blocking state port sends a second control packet to the first switch and second switch respectively;

(c) after receiving the second control packet, the first switch sends a third control packet for changing the port state of the switch that close to failure point and near the first switch to forwarding state;

(d) after receiving the second control packet, the second switch sends a fourth control packet to inquire if connection of the port of the first switch is normal or not; if yes, proceed to step (e); otherwise, proceed to step (g);

(e) the first switch sends a fifth control packet for blocking the port of the second switch, which connect the external network;

(f) the second switch sends the third control packet for changing the port state of the switch that close to failure point and near the second switch to forwarding state;

(g) the first switch sends a sixth control packet to the second switch, the second switch sends third control packet for changing the port state of the switch that close to failure point and near the second switch to forwarding state.

20. The method for conducting redundancy checks in a chain network according to claim 18, wherein the external network may be an external network device, which can be connected with the first and second switches of the chain network respectively through the blocking state and forwarding state ports.

21. The method for conducting redundancy checks in a chain network according to claim 18, wherein the external network may be an external redundant network architecture, which is connected with the first and second switches of the chain network respectively through the forwarding state and blocking state ports.

22. The method for conducting redundancy checks in a chain network according to claim 21, wherein the external redundant network architecture can be a network architecture applicable to redundant ring networks.

23. The method for conducting redundancy checks in a chain network according to claim 21, wherein the external redundant network architecture can be a network architecture that is based on STP or RSTP.

24. The method for conducting redundancy checks in a chain network according to claim 18, wherein the chain network and second chain network can be further connected with a third chain network, which has the first switch and second switch respectively at its both ends, and the first and second switches of the third chain network can be connected with the chain network and second chain network respectively through the forwarding state and blocking state ports.

25. The method for conducting redundancy checks in a chain network according to claim 18, wherein the switches detect link failure of the port by transmitting packets.

26. The method for conducting redundancy checks in a chain network according to claim 18, wherein the switches detect link failure of the port through the physical layer.

* * * * *